United States Patent [19]
Crago et al.

[11] Patent Number: 5,205,427
[45] Date of Patent: Apr. 27, 1993

[54] MODULAR FUEL TANK SYSTEM

[75] Inventors: Steven C. Crago, Clarksville, Ohio; John A. Eihusen, Kearney; Norman L. Newhouse, Lincoln, both of Nebr.

[73] Assignee: Brunswick Corporation, Skokie, Ill.

[21] Appl. No.: 852,687

[22] Filed: Mar. 17, 1992

[51] Int. Cl.5 .............................................. B65D 6/24
[52] U.S. Cl. ................................. 220/4.15; 220/4.16; 220/684; 220/693
[58] Field of Search .................. 244/120, 131, 135 R, 244/135 B; 220/684, 4.15, 4.16, 4.17, 4.12, 692, 693, 682, 683, 4.07, 4.08, 4.09, 4.33, 359, 612, 613, 684, 693, 4.15, 4.16; 206/328, 334

[56] References Cited

U.S. PATENT DOCUMENTS

| | | |
|---|---|---|
| 2,017,058 | 10/1935 | Freeze ................................ 220/693 |
| 2,755,045 | 7/1956 | Schmidt ........................ 244/135 R |
| 2,756,893 | 7/1956 | Barrere ............................... 220/684 |
| 2,895,635 | 7/1959 | Pollard et al. ...................... 220/4.15 |
| 3,095,112 | 6/1963 | Weinstein et al. ................. 220/613 |
| 3,166,212 | 1/1965 | Resos .................................. 220/4.12 |
| 3,209,533 | 10/1965 | Light ................................... 220/683 |
| 3,504,817 | 4/1970 | Heider ................................. 220/613 |
| 4,095,791 | 6/1978 | Smith et al. ....................... 206/328 |
| 4,108,328 | 8/1978 | Page .................................... 220/4.15 |
| 4,560,084 | 12/1985 | Wolfson .............................. 220/359 |
| 4,586,624 | 5/1986 | Shaw ................................... 220/613 |
| 4,715,565 | 12/1987 | Wittmann ........................... 244/120 |
| 4,790,350 | 12/1988 | Arnold ................................ 220/4.15 |
| 5,054,635 | 10/1991 | Kolom ................................ 220/4.16 |

FOREIGN PATENT DOCUMENTS

| | | | |
|---|---|---|---|
| 483588 | 5/1952 | Canada .............................. 220/4.154 |
| 1021784 | 12/1954 | Fed. Rep. of Germany ..... 220/4.16 |
| 2631313 | 11/1989 | France ............................... 220/4.12 |
| 786197 | 11/1957 | United Kingdom ............... 220/4.15 |

*Primary Examiner*—Allan N. Shoap
*Assistant Examiner*—S. Castellano
*Attorney, Agent, or Firm*—Wood, Phillips, VanSanten, Hoffman & Ertel

[57] ABSTRACT

A modular fuel tank system for use on aircraft and the like including a plurality of nestable shell sections which, when assembled in proper edgewise orientation, form a shell for the fuel tank. A joint assembly secures the shell sections in assembled condition and extends along mating edges of adjacent shell sections. All of the components of a plurality of fuel tanks are housed in a single container for shipping and handling purposes.

8 Claims, 6 Drawing Sheets

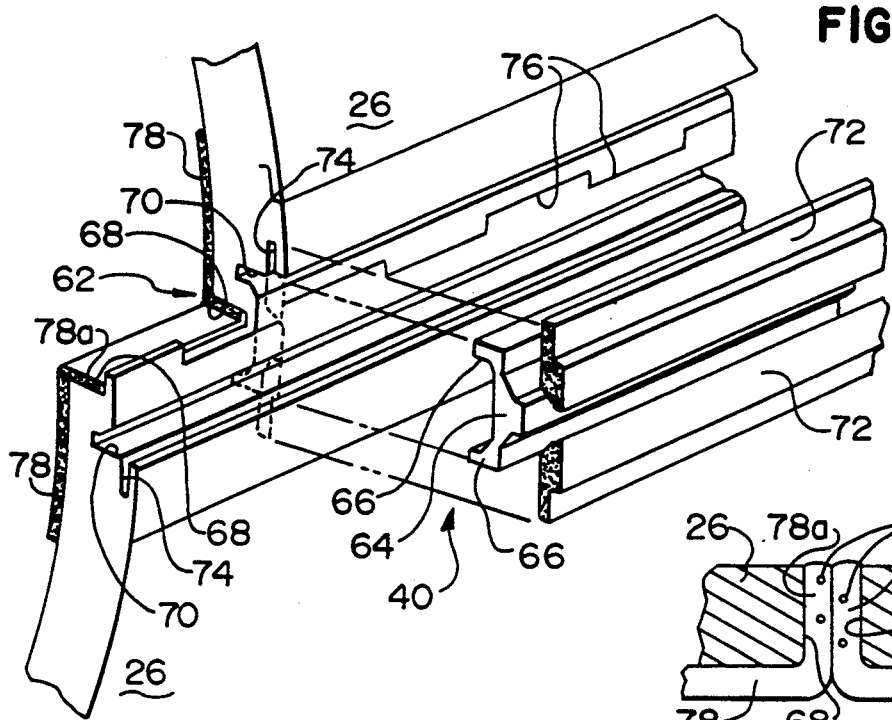
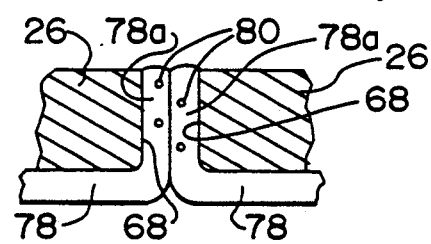
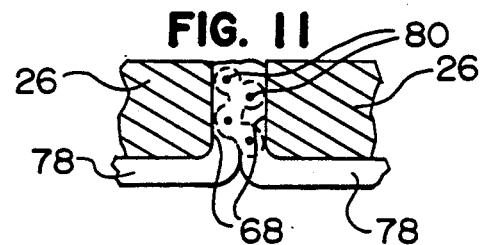
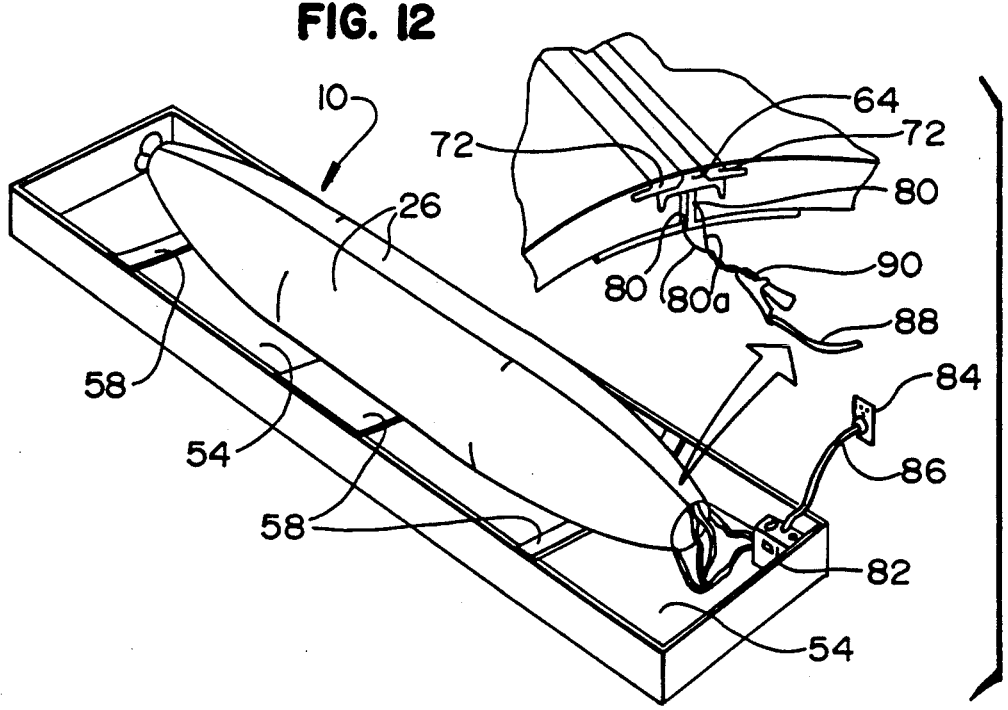

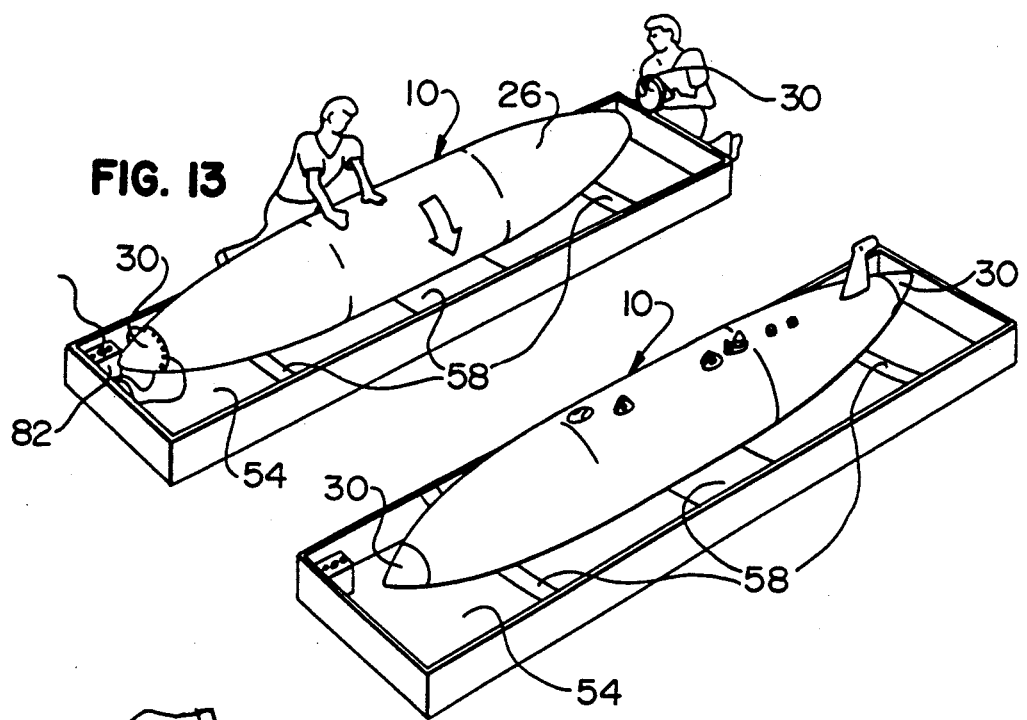
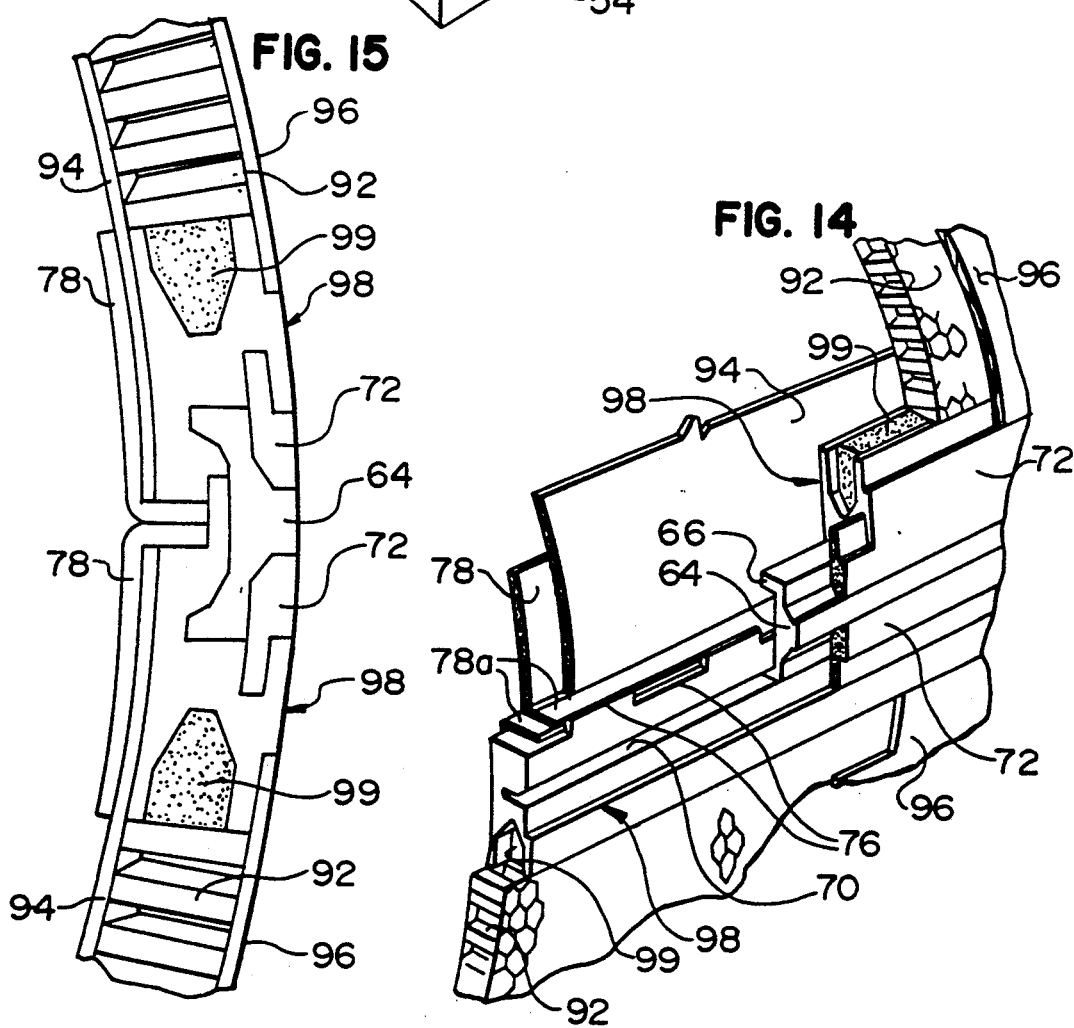

MODULAR FUEL TANK SYSTEM

FIELD OF THE INVENTION

This invention generally relates to fuel tanks for aircraft and the like, and, particularly, to a modular fuel tank system wherein the tanks can be readily field assembled.

BACKGROUND OF THE INVENTION

Some modern aircraft have fuel tank systems wherein the tanks are dropped in-flight when empty in order to reduce the weight of the aircraft and thereby extend its range. For instance, combat aircraft may include a plurality of fuel tanks in their propulsion system whereby each tank contains a given amount of fuel such that the total onboard fuel supply is sufficient to accomplish a given mission. As an example, one fuel tank may contain a sufficient amount of fuel to power the aircraft for approximately 100 miles down range. When that tank is empty, the fuel tank is physically discarded to reduce the weight of the aircraft and thereby extend its combat range as fuel is supplied by one or more additional tanks. Often, the fuel tanks are mounted externally of the aircraft, with an aerodynamic configuration, and the empty fuel tanks simply are released and dropped in-flight.

One of the main problems with such fuel tank systems is the amount of space or area required to maintain a sufficient inventory of discardable fuel tanks in a given environment. One example is where satellite bases are set up remote from a main military installation. Another example is on aircraft carriers which accommodate a considerable number of aircraft and which may be at sea for an extended period of time. A very large number of discardable fuel tanks must be maintained in inventory under such circumstances.

This invention is directed to solving the problems identified above and satisfying a need for a modular fuel tank system wherein the tanks are readily field assembled either on the ground, on aircraft carriers, or the like. In the example of the invention disclosed herein, as many as eight fuel tanks can be assembled from a carton of tank components which requires no more space than that required for a single assembled fuel tank.

SUMMARY OF THE INVENTION

An object, therefore, of the invention is to provide a novel modular fuel tank system wherein the fuel tanks are readily field assembled, sealed and ready for mounting directly onto appropriate aircraft.

The modular fuel tank system of the invention contemplates a plurality of nestable shell sections which, when assembled in proper edgewise orientation, form a shell for the fuel tank. Joint means are provided for securing the shell sections in assembled condition. The joint means extend along mating edges of adjacent sections and include retaining means for engaging complementary interengaging retaining means on the adjacent shell sections to secure the sections together in assembled condition.

As disclosed herein, the fuel tank is elongated, with an aerodynamic shape, and each shell section extends substantially the entire length of the tank. The tank is generally circular in cross-section and each shell section is concave in configuration to be nestable in a convex stack thereof for easy housing of a plurality of sections for a plurality of fuel tanks in a single container.

The system includes seal means positionable between the shell sections along their mating edges. In the preferred embodiment of the invention, the seal means are in the form of strips fabricated of thermoplastic material. The strips have conductor means embedded therein for the application of heat to melt the thermoplastic material after the shell sections are assembled. A container for the component parts of the fuel tanks has power transforming means for heating the thermoplastic seal means to facilitate the melting thereof.

Either the shell sections themselves or the joint means for securing the shell sections in assembled condition include complementarily interengaging surface means, such as interlocking toothed profiles along the mating edges of adjacent shell sections, to prevent relative movement of the shell sections in a shear direction. The joint means prevents separation of the shell sections, as by using a C-shaped strip spanning the mating edges of adjacent shell sections, with the legs of the C-shape extending into respective grooves in the adjacent shell sections thereby preventing lateral separation of the shell sections.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 9 is a fragmented perspective view, on an enlarged scale, illustrating the components of one embodiment of the joint means at the mating edges of adjacent shell sections of a fuel tank;

FIGS. 10 and 11 are fragmented sectional views through the seal means of a joint before and after, respectively, the joint has been melted;

FIG. 12 is a perspective view illustrating the lid of the container having transformer means to effect melting of the seal means;

FIG. 13 is a perspective view of two workmen finally assembling a modular fuel tank;

FIG. 14 is a perspective view of the joint means of FIG. 9, in combination with other details of the shell sections of the fuel tank;

FIG. 15 is a section through the structure of FIG. 14;

DETAILED DESCRIPTION OF THE PREFERRED EMBODIMENTS

Figure 1:
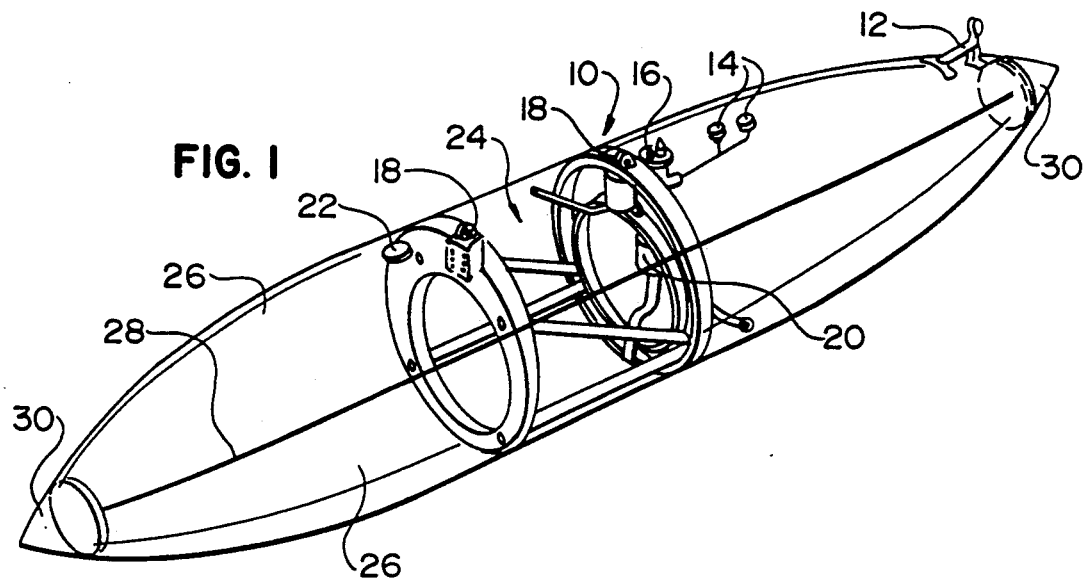
FIG. 1 is a perspective view of a modular fuel tank fabricated according to the concepts of the invention.

Referring to the drawings in greater detail, and first to FIG. 1, the modular fuel tank system of the invention contemplates a modular fuel tank, generally designated 10, for use on aircraft and the like. It should be understood that various components of the fuel tank are standard components and will not be described in great detail, including their interrelationships. For instance, in FIG. 1, the fuel tank includes an aft pivot fitting 12, electrical connections 14, a fuel/air probe 16, hoisting lugs 18, a fuel valve 20 and a gravity fill cap 22 for filling the tank with fuel when assembled. In addition, a modular internal supporting frame, generally designated 24, is provided and is shown of a particular construction. However, it should be understood that the internal supporting frame can take various configurations within the concepts of the invention.

The invention contemplates that fuel tank 10 be fabricated of a plurality of nestable shell sections 26 which, when assembled in proper edgewise orientation as shown in FIG. 1, form a composite shell for the fuel tank. Discardable fuel tanks of the character described herein often are mounted externally of an aircraft and, consequently, are aerodynamically shaped as shown by the elongated, circular "torpedo" shape shown in FIG. 1. The illustrated embodiment of the invention includes three shell sections 26 which extend substantially the entire length of the fuel tank. The shell sections are concave in configuration (i.e., in reference to their external surfaces), whereby the shell sections are nestable in a convex stack thereof as will be seen hereinafter. Mating edges of adjacent shell sections 26 meet along joints 28, and opposite ends of the shell sections at opposite ends of fuel tank 10 join with end caps 30 which are in "nose cone" shapes.

Figure 2:
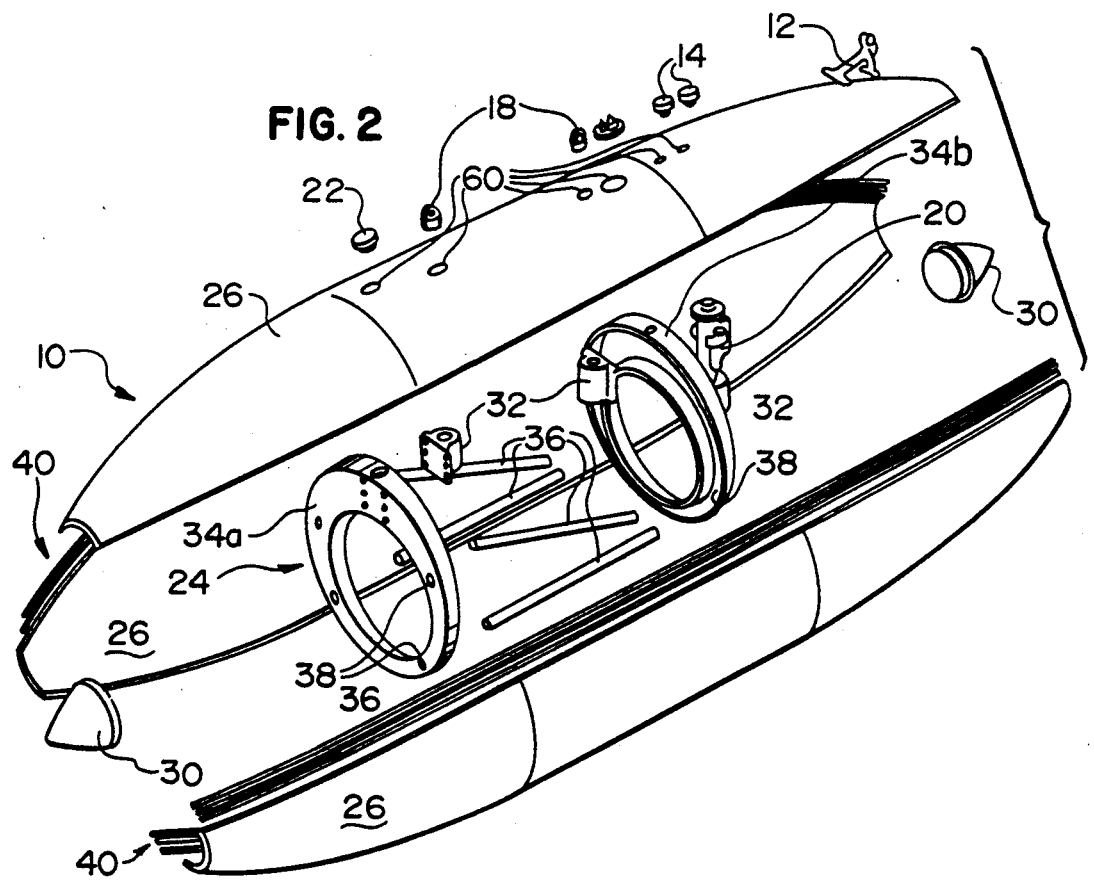
FIG. 2 is an exploded perspective view of the components of the fuel tank of FIG. 1.

FIG. 2 shows the components of fuel tank 10 described in relation to FIG. 1 in an exploded condition to facilitate the illustration. In this view, it can be seen that internal supporting frame means, generally designated 24, include a plurality of components for assembly in the field. For instance, it can be seen that valve 20 is mounted to frame means 24, by appropriate fasteners, and a pair of lug fittings 32 can be fixed by appropriate fastening means to the frame for receiving hoisting lugs 18. Frame means 24 include a pair of spaced circular frame components, including a forward frame component 34a and an aft frame component 34b. Circular frame components 34a, 34b are interconnected by appropriate frame support tubes 36 which may be internally threaded at their ends for accommodating assembly bolts (not shown) extending through apertures 38 in circular frame components 34a and 34b. FIG. 2 also shows joint means, generally designated 40, for securing shell sections 26 in assembled condition. It can be seen that joint means 40 extend along mating edges of adjacent shell sections. Generally, and as will be described in greater detail hereinafter, joint means 40 include retaining means for engaging complementary interengaging retaining means on the adjacent shell sections to secure the sections together in assembled condition, as shown in FIG. 2.

Figure 3:
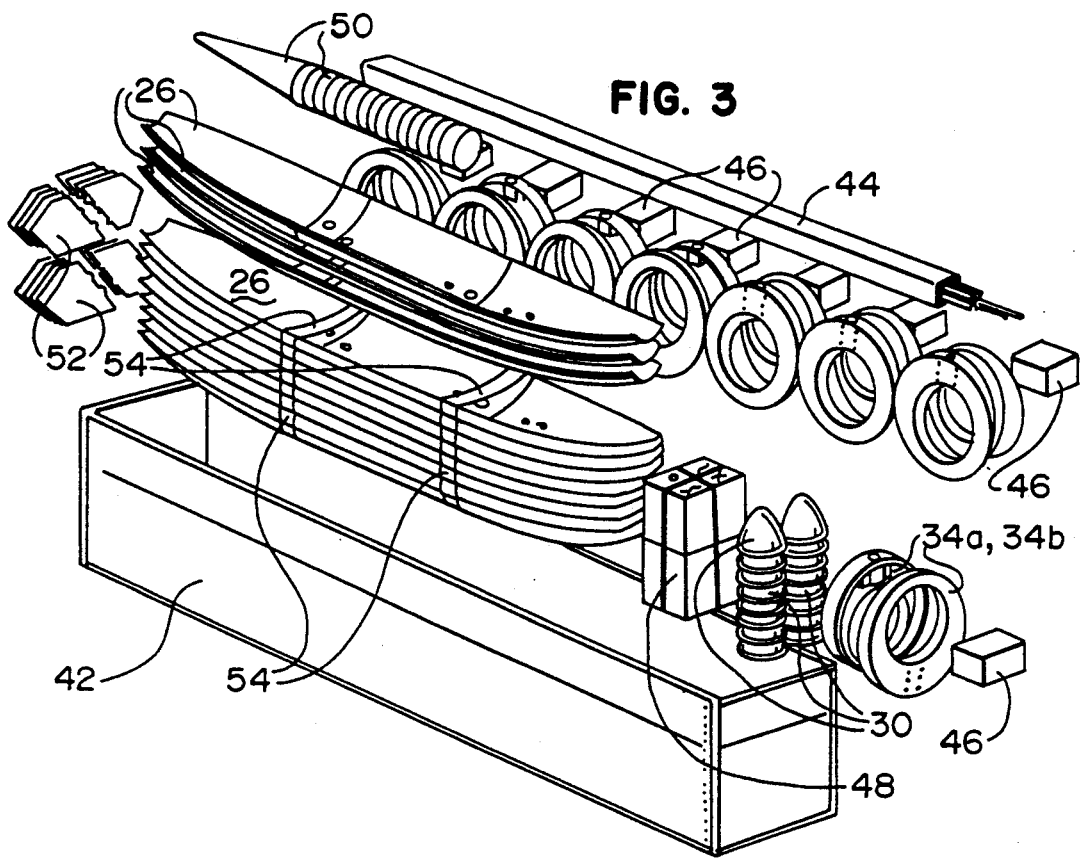
FIG. 3 is a perspective view of the modular fuel tank system according to the invention, illustrating the components of eight modular fuel tanks for housing in a single container, only the base of the container being shown.

FIG. 3 shows a base 42 of a box-like container within which all of the components of a plurality of modular fuel tanks 10 (FIGS. 1 and 2) can be housed for shipping and handling purposes. Various of the components described in relation to FIGS. 1 and 2 are shown, such as shell sections 26, end caps 30, circular frame components 34a and 34b and an elongated box-like container 44 is shown for housing such components as frame support tubes 36 and the components of joint means 40. Other internal boxes 46 can be provided for miscellaneous components, including a larger box 48 for the fuel system plumbing required for fuel tanks of this type. Other components such as tail cones 50 and fins 52 may also be accommodated within container base 42, depending on the precise configuration of the fuel tanks.

Figure 4:
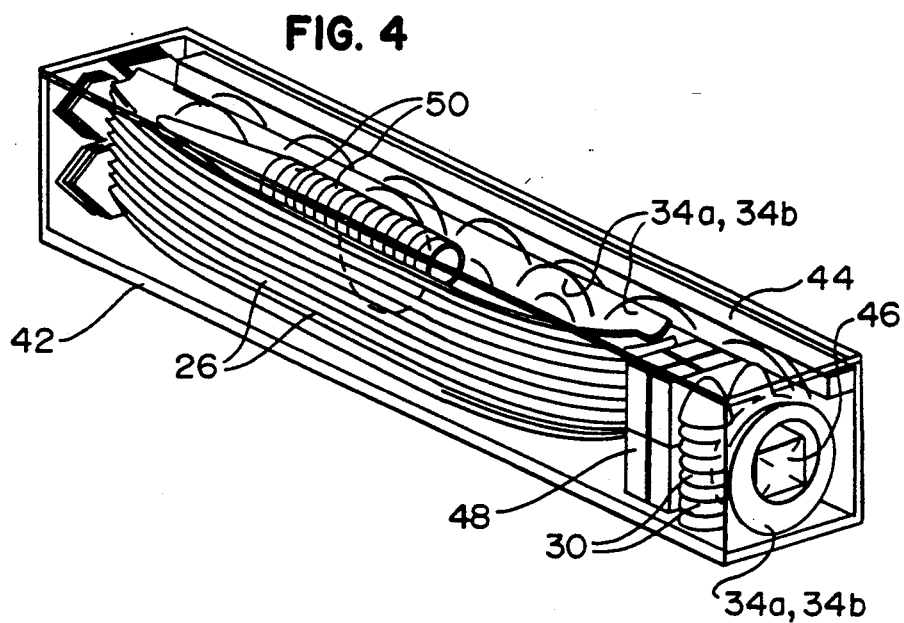
FIG. 4 is a perspective view of the container closed, with the fuel tank components contained therewithin.
Figure 5:
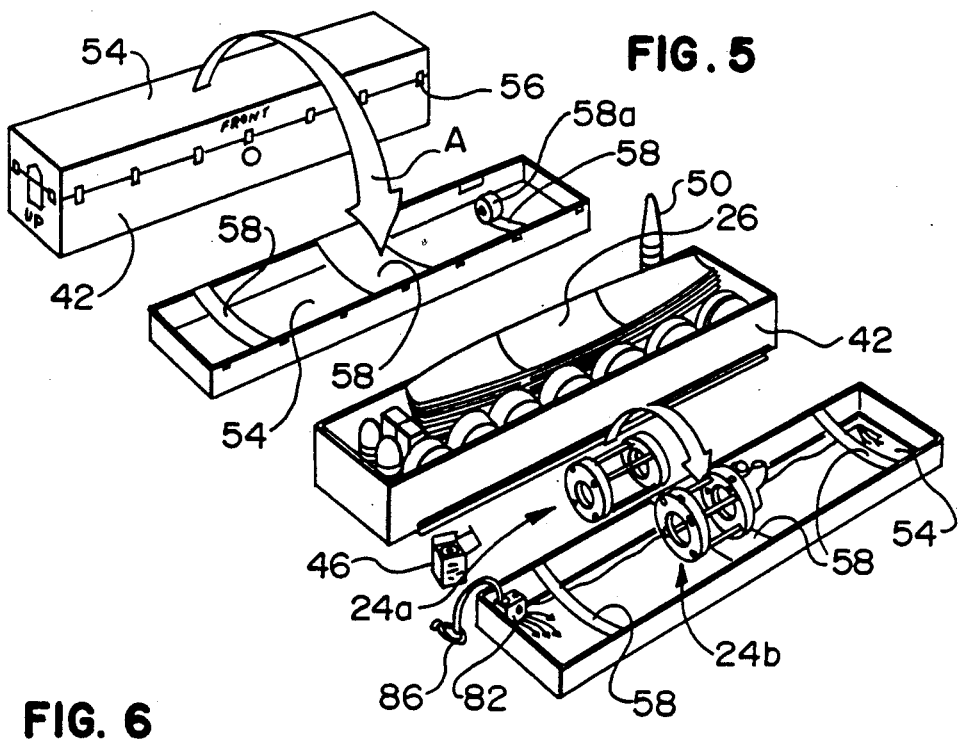
FIG. 5 is a somewhat schematic perspective view illustrating the manner in which the container for the fuel tank components is opened and the lid of the container used as an assembly fixture.

FIG. 3 specifically shows how concave shell sections 26 can be nested in a convex stack thereof for assembling a plurality of fuel tanks. It can be seen that three shell sections 26 are housed in container base 42 in "bundles" of three sections, as indicated by bundle strappings 54. The size of container base 42 has been selected for the illustration because it is of the approximate size corresponding to the space requirements of maintaining a completely assembled fuel tank in inventory. Yet, it can be seen that the container houses all of the components sufficient to assemble eight complete modular fuel tanks. The savings in required inventory space is considerable. For instance, FIG. 4 shows all of the components properly positioned within the container, with the nestable shell sections properly stacked therewithin, and even utilizing the space within the convex stack of shell sections.

Figure 6:
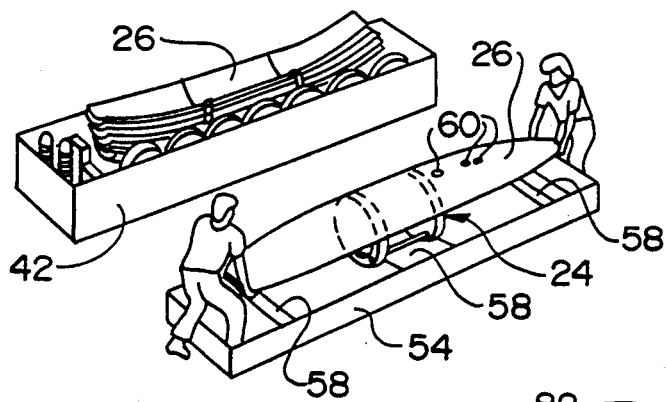
FIGS. 6-8 illustrate the manner in which two workmen would use the container for assembling a fuel tank.
Figure 8:
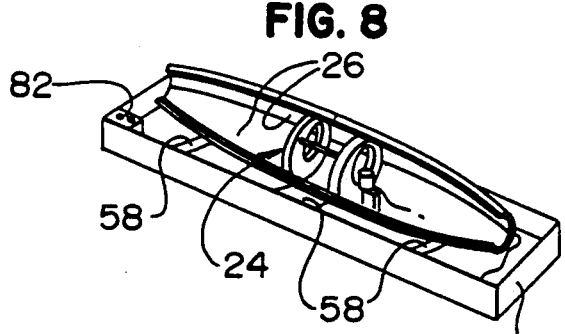
Figure 7:
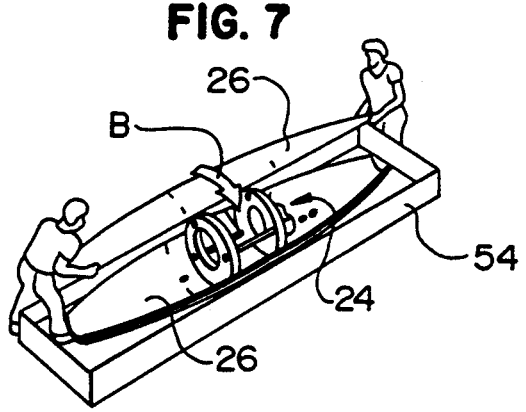

FIGS. 5-8 show somewhat schematically how modular fuel tanks 10 might be individually assembled out of container base 42, as needed. The container includes a lid 54 positionable over base 42 and held thereon by appropriate latches 56. When it is desired to assemble a fuel tank out of the container, lid 54 is removed and placed upside down on a support surface as indicated by arrow "A". The lid includes flexible strapping 58 which extends between its top edges when placed upside down. The strapping may be affixed permanently or provided in roll form, as indicated at 58a. Lid 54 and strapping 58 provide an assembly fixture for assembling a fuel tank. For instance, it can be seen in FIG. 5 that one internal support frame 24 has been assembled, as at 24a, and then positioned on the center strapping 58, as indicated at 24b. This now frees up workmen to lift shell sections 26 off of their nested stack thereof within container base 42 and begin assembling the shell sections to the internal frame, as illustrated in FIGS. 6-8.

Specifically, FIG. 6 shows two workmen assembling a shell section 26 to the top of assembled frame 24. This may be the top shell section as viewed in FIG. 1, including appropriate apertures 60 for receiving and assembling such components as electrical connectors 14, probe 16, hoisting lugs 18, etc. The section is secured to the internal frame by conventional fastening means, such as rivets. Once the top shell section is secured to the frame as shown in FIG. 6, this subassembly can be rotated as shown in FIG. 7 so that the shell section is supported by all three strappings 58 (FIG. 5), and a second shell section is removed from the stack thereof within container base 42 and positioned on frame 24, as indicated by arrow "B" in FIG. 7. The joint means 40 (FIG. 2) will be assembled between the mating edges of the adjacent shell sections, as described hereinafter.

FIG. 8 shows the first two shell sections fully assembled onto internal frame 24, leaving a considerable access area to the interior of the subassembly for the workmen to begin connecting all of the conventional fuel lines, valves, electrical connections and the like. Once all of the internal components are assembled and interconnected, the third shell section then is properly assembled to the previously two assembled sections, and end caps 30, fins 52, a tail cone 50 and any other appropriate external components can be secured in place.

FIG. 9 shows, in detail, the components of joint means 40 for securing adjacent shell sections 26 in assembled condition, as well as a seal means 62 for sealing the joints between the adjacent sections. Specifically, joint means 40 include a C-shaped strip 64 having radially inwardly projecting legs 66. The C-shaped strip spans the mating edges 68 of adjacent shell sections 26. Each shell section has a radially inwardly projecting groove 70 for receiving legs 66 of C-shaped strip 64. Therefore, the strip provides retaining means for engaging complementary interengaging retaining means on the adjacent shell sections to secure the sections together against separation or relative movement in a generally tangential direction. Once legs 66 of C-shaped strip 64 are inserted into grooves 70, retainer or keeper strips 72 are force fit into grooves 74 in shell sections 26. It can be seen that grooves 74 extend transversely or perpendicular to grooves 70 and, therefore, keeper strips 72 prevent C-shaped strip 64 from coming out of its retaining position securing the shell sections together.

In addition, the joint means include complementarily interengaging surface means in the form of toothed profiles 76 along mating edges 68 of the shell sections to prevent relative movement of the shell sections in a shear direction longitudinally of the mating edges. As will be seen hereinafter, these toothed profiles can be incorporated directly into joint means 40.

Referring to FIGS. 10 and 11 in conjunction with FIG. 9, seal means 62 is provided in the form of a pair of L-shaped seal strips 78 having legs 78a of the L-shape extending in juxtaposition between mating edges 68 of adjacent shell sections 26. These strips are fabricated of meltable thermoplastic material and have conductor means in the form of Nichrome wires 80 embedded therein, at least embedded in leg portions 78a of the thermoplastic strips. As seen in FIG. 11, this provides a "melt zone" directly between mating edges 68 of adjacent shell sections. By conducting a current through wires 80, heat is generated to melt legs 78a of thermoplastic strips 78 whereby the thermoplastic material forms a homogeneous seal entirely between the mating edges of the shell sections.

FIG. 12 shows that wires 80 within the thermoplastic seal strips 78 can project beyond one end of the strips, as at 80a. Lid 54 of the container for the modular fuel tanks is provided with a transformer 82 mounted in one corner of the lid for plugging into an appropriate electrical outlet 84 by means of an electrical cord 86. The transformer may include an electrical cord 88 having a clamp 90 on the end thereof for clamping onto the terminal ends 80a of wires 80 for applying a current through the wires to generate heat and melt the thermoplastic material. Again, by mounting the transformer within the lid, the modular fuel tank system is substantially self-contained to facilitate full field assembly of modular fuel tanks wherever electricity can be generated.

Lastly, FIG. 13 shows two workmen finally assembling a modular fuel tank by assembling end caps 30 to the assembled shell sections 26. The joint means and the seal means between the end caps and the ends of the assembled shell sections can be similar to joint means 40 and seal means 62, only that these means are circular in configuration rather than elongated as described above. To that end, it can be seen in the top depiction of FIG. 13 that transformer 82 now is electrically coupled to the seal means between the left-hand end cap 30 and the left-hand ends of the assembled shell sections.

FIGS. 14 and 15 show the adjacent shell sections, joint means and seal means as described substantially in relation to FIG. 9. This view simply illustrates that the shell sections themselves may be fabricated of a composite including a honeycomb core 92, a filament wound inner skin 94, a filament wound outer skin 96, and a joint core insert, generally designated 98, with a foam filler 99. The joint core insert can be easily molded of plastic material, extruded of plastic or metallic material, or the like, to facilitate forming grooves 70 and 74 for receiving legs 66 of C-shaped strip 64 and for receiving keeper strips 72, respectively. Otherwise, like numerals have been applied in FIGS. 4 and 5 to like components corresponding to the above descriptions.

Figure 16:
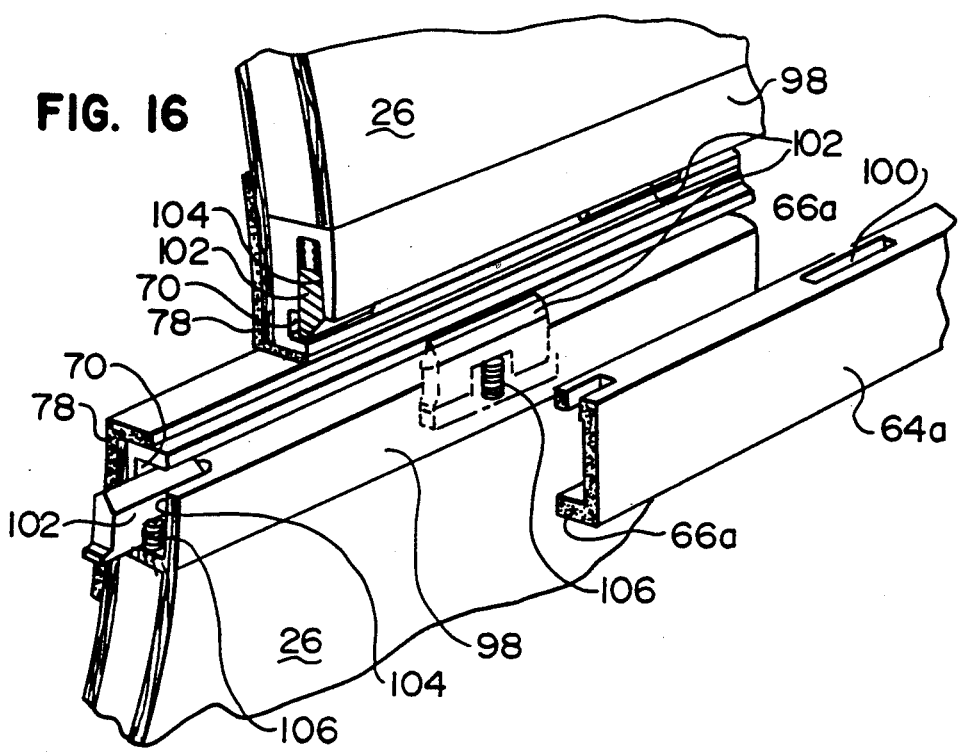
FIG. 16 is a view similar to that of FIG. 9, illustrating another form of joint means at the mating edges of adjacent shell sections.

FIG. 16 shows another form of joint means for securing shell sections 26 in assembled condition, preventing tangential separation and preventing movement in a shear direction. Again, thermoplastic sealing strips 78 are used in this embodiment, as described above. Joint core insert 98 of adjacent shear sections 26 again has radially extending grooves 70 for receiving the legs 66a of a C-shaped strip 64a which secures the shell sections against separation. However, in this embodiment, legs 66a of the C-shaped retaining strip have a plurality of spaced slots 100 for receiving a plurality of retainer clips 102 which are positioned in recesses 104 in the joint core inserts 98 of adjacent shell sections. Retainer clips 100 are loaded by springs 106 so as to be biased outwardly of recesses 104, transverse to grooves 70. The distal ends of retainer clips 102 abut against opposite walls of grooves 70 in joint core inserts 98. The distal ends are provided with angled camming surfaces facing radially outwardly whereby, when C-shaped strip 64a is inserted into grooves 70, the retainer clips will be moved against their spring loading and snap back into slots 100 to hold the C-shaped strip 64 in position in grooves 70. In addition, retainer clips 102 prevent relative movement of the adjacent shell sections in a shear direction.

Figure 17:
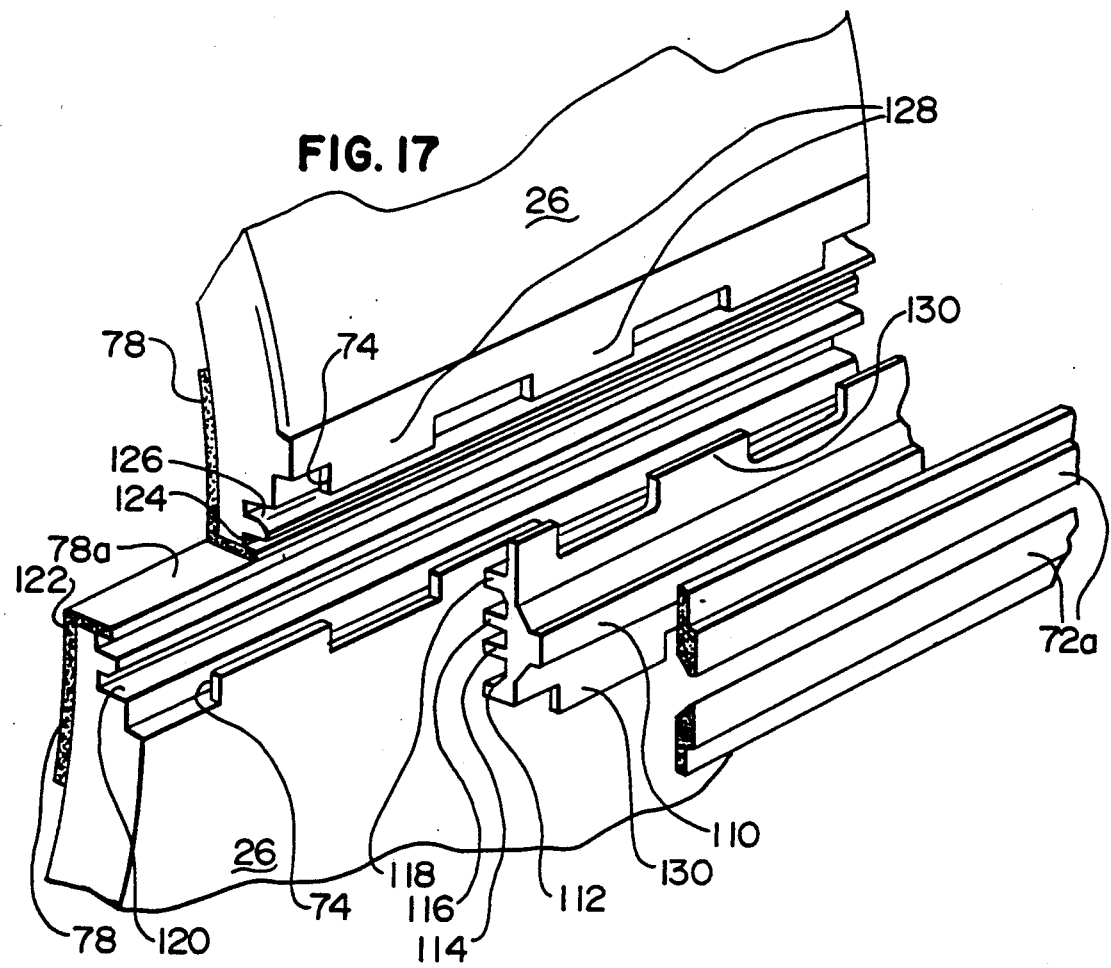
FIG. 17 is a view similar to that of FIGS. 9 and 16, illustrating a further form of joint means.

FIG. 17 shows a further form of joint and seal means for adjacent shell sections 26. Again, thermoplastic sealing strips 78 are used, and retainer or keeper strips 72a are used similar to keeper strips 72 (FIG. 9). In this embodiment, a joint strip 110 has a plurality of radially inwardly directed ribs 112, 114, 116 and 118. The lower shell section 26 is provided with radially outwardly opening grooves 120 and 122. The upper shell section 26 is provided with radially outwardly opening grooves 124 and 126. When joint strip 110 is moved radially inwardly toward the abutting shell sections, ribs 112, 114, 116 and 118 are received in grooves 120, 122, 124 and 126, respectively. This prevents separation of the shell sections, and keeper strips 72a inserted into grooves 74 holds joint strip 110 in position. In this embodiment, each shell section 26 is provided with a toothed profile 128 extending along its mating edge for interlocking in oppositely directed toothed profiles 130 on joint strip 110 to prevent relative movement of the shell sections in a shear direction longitudinally of the sections.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A modular fuel tank system for use on aircraft, comprising:

a plurality of nestable shell sections which, when assembled in proper edgewise orientation, form a shell for a fuel tank;

joining means including transversely irregularly shaped joint strips for securing the shell sections in assembled condition, the joining means extending along mating edges of adjacent shell sections and including retaining means for engaging complementary inter-engaging retaining means on the adjacent shell sections to secure the sections together in assembled condition, said joint strips being generally C-shaped and spanning the mating edges of adjacent shell sections, with one leg of the C-shape extending into a groove in one shell section an another leg of the C-shape extending into a groove in the adjacent shell section thereby preventing separation of the shell sections; and retainer strips on the shell sections for holding the C-shaped strips in the grooves in the shell sections.

2. The modular fuel tank system of claim 1 wherein said retainer strips are press fit into grooves in the shell sections transverse to the grooves for receiving the legs of the C-strips.

3. In combination with a modular fuel tank system comprising a plurality of nestable shell sections which, when assembled in proper edgewise orientation, form a shell for a fuel tank, and joining means including transversely irregularly shaped joint strips for securing the shell sections in assembled condition, the joining means extending along mating edges of adjacent shell sections and including retaining means for engaging complementary inter-engaging retaining means on the adjacent shell sections to secure the sections together in assembled condition, a container for receiving the nestable shell sections, thermoplastic seals positionable between the shell sections along said mating edges of adjacent sections, and a power transformer on the container for heating the thermoplastic seals to facilitate melting the same.

4. In combination with the modular fuel tank system of claim 3, wherein said seals are in the form of strips of thermoplastic material having a conductor embedded therein for coupling to the power transformer on the container.

5. A modular fuel tank system for use on aircraft wherein a fuel tank is elongated and circular in cross-section, comprising:

a plurality of elongated shell sections extending substantially the entire length of the tank which, when assembled in proper edgewise orientation, form a shell for the fuel tank, each shell section being concave in configuration to be nestable in a convex stack thereof in unassembled condition;

joining means including transversely irregularly shaped joint strips for securing the shell sections in assembled condition, the joining means extending along mating edges of adjacent shell sections and including retaining means for engaging complementary inter-engaging retaining means on the adjacent shell sections to secure the sections together in assembled condition;

the mating edges of adjacent shell sections including complementarily inter-engaging surfaces to prevent relative movement of the shell sections in longitudinal direction when in assembled condition, said joint strips being generally C-shaped and span the mating edges of adjacent shell sections, with one leg of the C-shape extending into a groove n one shell section and another leg of the C-shape extending into a groove in the adjacent shell section thereby preventing separation of the shell sections; and retainer strips on the shell sections for holding the C-shaped strips in the grooves in the shell sections.

6. The modular fuel tank system of claim 5 wherein said complementarily interengaging surfaces comprise an interlocking toothed profile along the mating edges of adjacent shell sections.

7. A modular fuel tank system for use on aircraft wherein a fuel tank is elongated and circular in cross-section, comprising:

a plurality of elongated shell sections extending substantially the entire length of the tank which, when assembled in proper edgewise orientation, form a shell for the fuel tank, each shell section being concave in configuration to be nestable in a convex stack thereof in unassembled condition;

joining means for securing the shell sections in assembled condition, the joining means including an elongated strip extending along mating edges of adjacent shell sections, the strip including retaining means for engaging complementary inter-engaging retaining means on the adjacent shell sections to secure the sections together in assembled condition, said elongated strip being C-shaped and spanning the mating edges of adjacent shell sections, with one leg of the C-shape extending into a groove in one shell section and another leg of the C-shape extending into a groove in the adjacent shell section thereby preventing separation of the shell sections; and retainer strips on the shell sections for holding the C-shaped strips in the grooves in the shell sections.

8. The modular fuel tank system of claim 7 wherein said retainer strips are press fit into grooves in the shell sections transverse to the grooves for receiving the legs of the C-strips.

* * * * *